(12) United States Patent
Castellan et al.

(10) Patent No.: US 12,162,590 B2
(45) Date of Patent: Dec. 10, 2024

(54) AIRCRAFT LANDING GEAR PROVIDED WITH A LEAF SPRING LOCKING DEVICE

(71) Applicant: SAFRAN LANDING SYSTEMS, Velizy Villacoublay (FR)

(72) Inventors: Clément Castellan, Moissy-Cramayel (FR); Matteo Capurro, Moissy-Cramayel (FR); Thierry Blanpain, Moissy-Cramayel (FR); Nicolas Nguyen, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 18/031,782

(22) PCT Filed: Oct. 14, 2021

(86) PCT No.: PCT/EP2021/078485
§ 371 (c)(1),
(2) Date: Apr. 13, 2023

(87) PCT Pub. No.: WO2022/079187
PCT Pub. Date: Apr. 21, 2022

(65) Prior Publication Data
US 2024/0017821 A1    Jan. 18, 2024

(30) Foreign Application Priority Data
Oct. 14, 2020 (FR) ...................................... 2010523

(51) Int. Cl.
*B64C 25/26* (2006.01)
*B64C 25/62* (2006.01)

(52) U.S. Cl.
CPC .............. *B64C 25/26* (2013.01); *B64C 25/62* (2013.01)

(58) Field of Classification Search
CPC ... B64C 25/26; B64C 25/62; B64C 2025/125; B64C 25/12
See application file for complete search history.

(56) References Cited

U.S. PATENT DOCUMENTS 2,529,401 A * 11/1950 Lawson .................. B64C 25/14
                                                     244/102 SL
2,562,778 A *  7/1951 Egly ........................ B64C 25/12
                                                        267/173

(Continued)

FOREIGN PATENT DOCUMENTS

EP      0 026 689 A2    4/1981
EP      1 988 015 A1   11/2008
(Continued)

OTHER PUBLICATIONS

International Search Report for PCT/EP2021/078485 dated, Jan. 24, 2022 (PCT/ISA/210).

*Primary Examiner* — Assres H Woldemaryam
(74) *Attorney, Agent, or Firm* — Sughrue Mion, PLLC (57) ABSTRACT

An aircraft undercarriage comprising: a leg connected to an aircraft structure to be movable between a deployed position and a retracted position; a brace member for holding the leg in its deployed position and comprising a first rod hinged to the aircraft structure and a second rod hinged to the first link and to the leg; a stabilizer member for holding the first and second rods in an aligned position and comprising a first link and a second link that are hinged to each other, with at least one of them being hinged to the brace member; and a spring for elastically urging the hinges of the first and second links into a generally aligned position.
The spring comprises at least one spring blade arranged to be subjected to an axial compression force when the first and second links leave the generally aligned position.

11 Claims, 8 Drawing Sheets

(56) References Cited

U.S. PATENT DOCUMENTS

| | | | | |
|---|---|---|---|---|
| 4,355,773 | A | * | 10/1982 | Masclet .................. B64C 25/14 244/102 R |
| 5,460,340 | A | * | 10/1995 | White ..................... B64C 25/00 244/104 FP |
| 9,511,852 | B2 | * | 12/2016 | Blanpain ................. B64C 25/62 |
| 10,457,383 | B2 | * | 10/2019 | Schmidt .................. B64C 25/10 |
| 2009/0057485 | A1 | | 3/2009 | Seror-Goguet et al. |
| 2011/0163202 | A1 | | 7/2011 | Martinez et al. |
| 2012/0080559 | A1 | | 4/2012 | Keller et al. |
| 2013/0119197 | A1 | | 5/2013 | Ducos |
| 2015/0203192 | A1 | * | 7/2015 | Slanker .................. B64C 25/12 244/102 R |
| 2016/0272305 | A1 | * | 9/2016 | Schmidt .................. B64C 25/10 |
| 2016/0347444 | A1 | * | 12/2016 | Vatovec ................... F03G 1/10 |
| 2019/0144104 | A1 | * | 5/2019 | Fortier .................... B64C 25/26 244/102 R |

FOREIGN PATENT DOCUMENTS

| | | |
|---|---|---|
| EP | 2 265 493 A2 | 12/2010 |
| EP | 2 437 978 A1 | 4/2012 |
| EP | 2 571 760 A2 | 3/2013 |
| EP | 3 069 993 A1 | 9/2016 |
| EP | 3 100 948 A1 | 12/2016 |
| WO | 2009/115713 A2 | 9/2009 |
| WO | 2010/139756 A1 | 12/2010 |
| WO | 2011/144629 A2 | 11/2011 |

* cited by examiner

AIRCRAFT LANDING GEAR PROVIDED WITH A LEAF SPRING LOCKING DEVICE

CROSS REFERENCE TO RELATED APPLICATIONS

This application is a National Stage of International Application No. PCT/EP2021/078485 filed Oct. 14, 2021, claiming priority based on French Patent Application No. 2010523 filed Oct. 14, 2020, the contents of each of which being herein incorporated by reference in their entireties.

The present invention relates to the field of landing gear, and more particularly to means for enabling an undercarriage to be locked in its deployed position.

BACKGROUND OF THE INVENTION

Aircraft undercarriages are known that comprise a leg connected to the structure of an aircraft so as to be movable, under the action of a drive actuator, between a deployed position (for takeoff and landing) and a retracted position (in flight).

The leg is held in the deployed position by a breakable strut that is coupled both to the leg and to the structure of the aircraft, and that comprises two rods that are hinged together and held in an aligned position by a stabilizer member.

The stabilizer member comprises two links that are hinged together and held in a substantially aligned position by a passive locking member in order to prevent the strut from coming out of alignment.

In general, the locking member comprises one or more coil springs having ends connected to the strut and to the stabilizer member so as to exert a traction force on said stabilizer member and thus prevent the links from coming out of alignment.

It is common practice for the undercarriage to be arranged so that, in the event of the drive actuator failing, it can be moved under gravity from its retracted position to its deployed position. The coil springs are generally designed to assist in moving the undercarriage to its deployed position and to lock it in that position.

As a result, the coil springs oppose the action of the drive actuator while the undercarriage is being raised, and the linear behavior of the coil springs gives rise to large additional forces that need to be overcome while the undercarriage is being moved to its retracted position, and the drive actuator must be designed accordingly.

Furthermore, coil springs are expensive and relatively heavy.

OBJECT OF THE INVENTION

An object of the invention is thus to propose an aircraft undercarriage enabling the above-mentioned problems to be obviated at least in part.

SUMMARY OF THE INVENTION

To this end, the invention provides an aircraft undercarriage comprising:
  a leg arranged to be connected to an aircraft structure to be movable between a deployed position and a retracted position;
  at least one brace member for holding the leg in its deployed position and comprising a first rod hinged to the aircraft structure and a second rod hinged to the first rod and to the leg;
  a stabilizer member for holding the first and second rods in an aligned position and comprising a first link and a second link that are hinged to each other, with at least one of them being hinged to the brace member; and
  at least one spring for elastically urging the hinges of the first and second links into a generally aligned position.

According to the invention, the spring is a spring blade arranged to be subjected elastically to an axial compression force when the hinges of the first and second links leave their generally aligned position.

Compressing the blade axially causes it to buckle in such a manner that the force that needs to be delivered for breaking the alignment of the links varies little while the blade is buckling. While the undercarriage is being deployed, this behavior of the spring blade makes it possible to obtain a force that is sufficient for locking the undercarriage in its deployed position at the end of a stroke that is small, and while the undercarriage is being raised, this behavior limits the forces that need to be overcome by the drive actuator.

Furthermore, such a locking member is found to be inexpensive to produce and it is relatively light in weight.

In particular manner, the spring blade is pivotally connected to the first rod and to the stabilizer member.

In particular manner, the spring blade is pivotally connected to the second rod and to the stabilizer member.

According to a particular characteristic, the spring blade is a metal plate of substantially constant thickness.

According to another particular characteristic, the undercarriage includes two spring blades in order to provide redundancy in the event of one of the two spring blades failing.

In particular manner, the two spring blades are substantially identical and they are pivotally connected to the first rod and to the stabilizer member.

In particular manner, the two spring blades are substantially identical and they are pivotally connected to the second rod and to the stabilizer member.

In particular manner, one of the spring blades is pivotally connected to the first rod and to the stabilizer member, and the other spring blade is pivotally connected to the second rod and to the stabilizer member.

In particular manner, the first link is hinged to the leg and the second link is hinged to the brace member.

In particular manner, the first link is hinged to the second rod and the second link is hinged to the first rod.

The invention also provides an aircraft including at least one such undercarriage.

BRIEF DESCRIPTION OF THE DRAWINGS

The invention can be better understood in the light of the following description, which is purely illustrative and non-limiting, and which should be read with reference to the accompanying drawings, in which.

DETAILED DESCRIPTION OF THE INVENTION

With reference to FIGS. 1a to 1d, an aircraft undercarriage 1 comprises, in conventional manner, a leg 2 having a first end hinged to a structure 3 of an aircraft about a hinge axis X1 so that the leg 2 is movable between a deployed position (FIG. 1a) and a retracted position under the action of a drive actuator (not shown), e.g. a hydraulic actuator. The leg 2 has an opposite end (not shown in the figures) carrying an axle having one or more wheels rotatably mounted thereon.

A breakable strut 4 is hinged firstly to the leg 2 and secondly to the structure 3 of the aircraft, and it forms a brace member for holding the leg 2 in its deployed position. The breakable strut 4 comprises two rods 4a and 4b that are hinged together about a hinge axis X2 at a knee 4c. The rod 4a is also hinged to the structure 3 of the aircraft about a hinge axis X3, while the rod 4b is hinged to the leg 2 about a hinge axis X4.

The breakable strut 4 is stabilized in a substantially aligned position by means of a stabilizer member 5 comprising two links 5a and 5b that are also hinged together about a hinge axis X5 at a knee 5c. The link 5a is hinged to the leg 2 about a hinge axis X6, and the link 5b is hinged to the breakable strut 4 about the axis X2. The links 5a and 5b are held in a substantially aligned position by a locking member 6 urging the links 5a and 5b towards the locked position as shown in FIG. 1a and as defined by abutments between the links 5a and 5b.

Figure 1A:
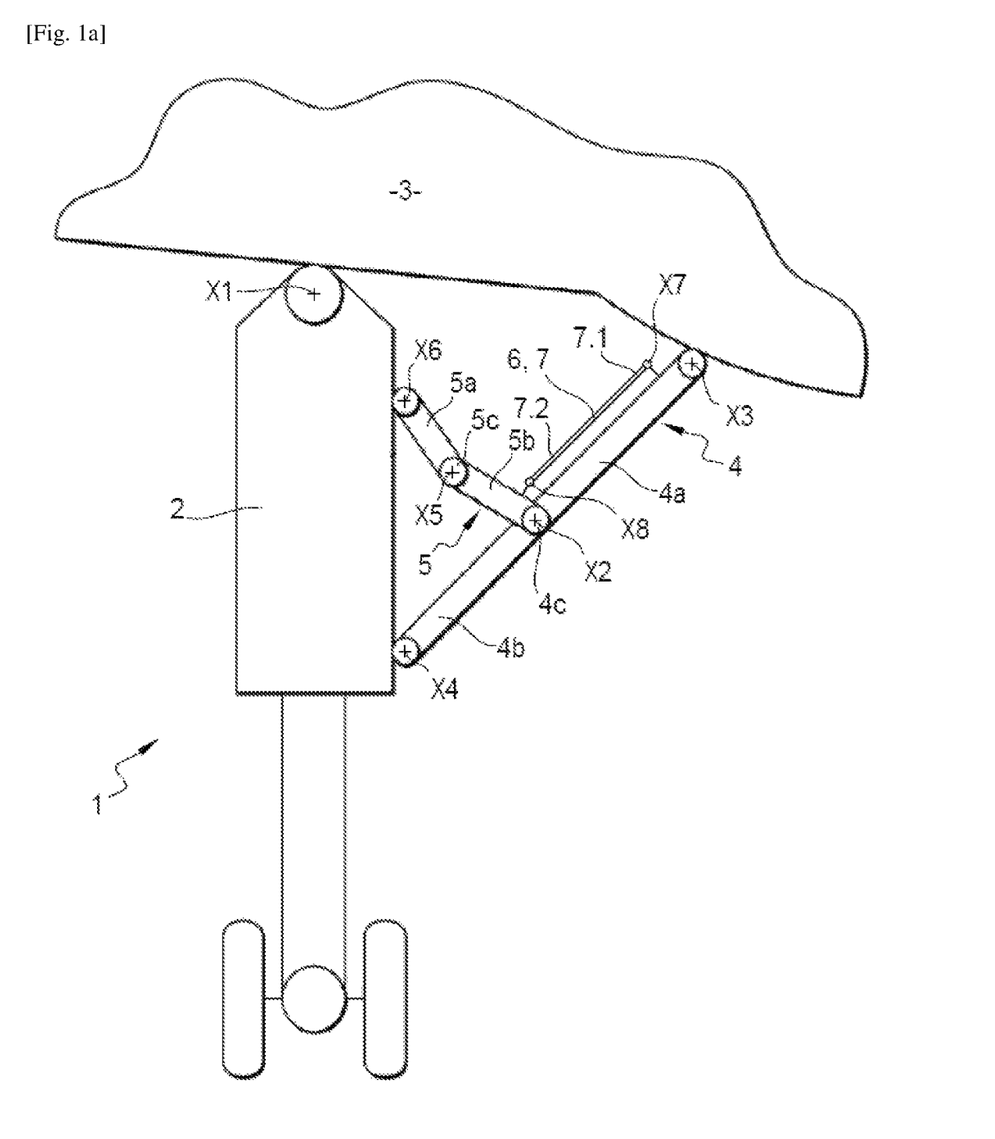
FIG. 1a is a diagrammatic view of an aircraft undercarriage in a first embodiment of the invention, shown in its deployed position.

When it is thus stabilized in a substantially aligned position, the foldable strut 2 opposes any pivoting of the leg 4 about its hinge axis X1, such that the deployed position shown in FIG. 1a is a stable position. As is well known, the rods 4a and 4b and the links 5a and 5b are designed so that in order to reach the locked position shown in FIG. 1, both the hinge knee 4c between the rods 4a and 4b and also the hinge knee 5c between the links 5a and 5b go a little way beyond the rods 4a and 4b and the links 5a and 5b being in geometrical alignment. In known manner, the hinges are arranged to avoid becoming statically indeterminate, e.g. by means of operating clearances or at least one ball joint.

The locking member 6 comprises a spring for holding the links 5a and 5b elastically in the substantially aligned position. In accordance with the invention, in this embodiment, the spring is a metal blade 7 of elongate shape that extends along the rod 4a. The blade 7 presents thickness and width that are generally constant, with its width being taken as extending substantially parallel to the hinge axes X1-X6 and being greater than its thickness. For example, the blade 7 may have a length equal to 800 millimeters (mm), a thickness equal to 50 mm, and a thickness equal to 3.5 mm.

The blade 7 has a first end 7.1 pivotally connected to the rod 4a to pivot about a pivot axis X7 situated in the proximity of the hinge axis X3 of the rod 4a, and a second end 7.2 pivotally connected to the stabilizer member 5 to pivot about a pivot axis X8 in the proximity of the hinge axis X2 of the knee 4c. Thus, when the leg 2 is in its deployed position, the blade 7 is in a deformed state close to its rest state with the end 7.1 being spaced apart from the end 7.2 by a first distance; when the leg 2 is in its retracted position, the blade 7 has buckled and is in a deformed state with the end 7.1 being spaced apart from the end 7.2 by a second distance that is less than the first distance. It is the folding of the locking member 6 that causes the ends 7.1 and 7.2 to move towards each other and thus causes the blade 7 to buckle. The blade 7 is thus stressed elastically in compression, and it tends to return towards its rest state, with the ends 7.1 and 7.2 tending to move apart from each other back towards the first distance.

Figure 1B:
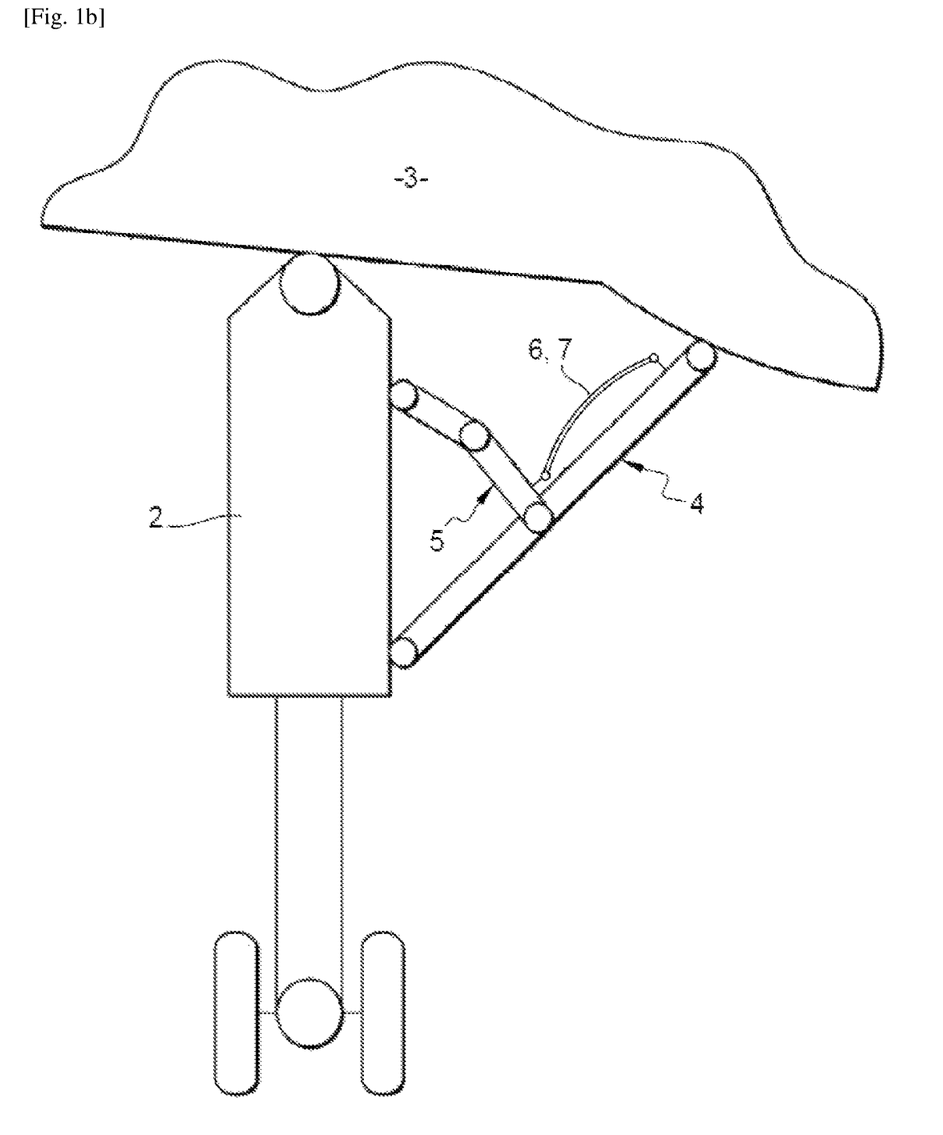
FIG. 1b is is a view analogous to FIG. 1a, showing the undercarriage in an unlocked position.
Figure 1C:
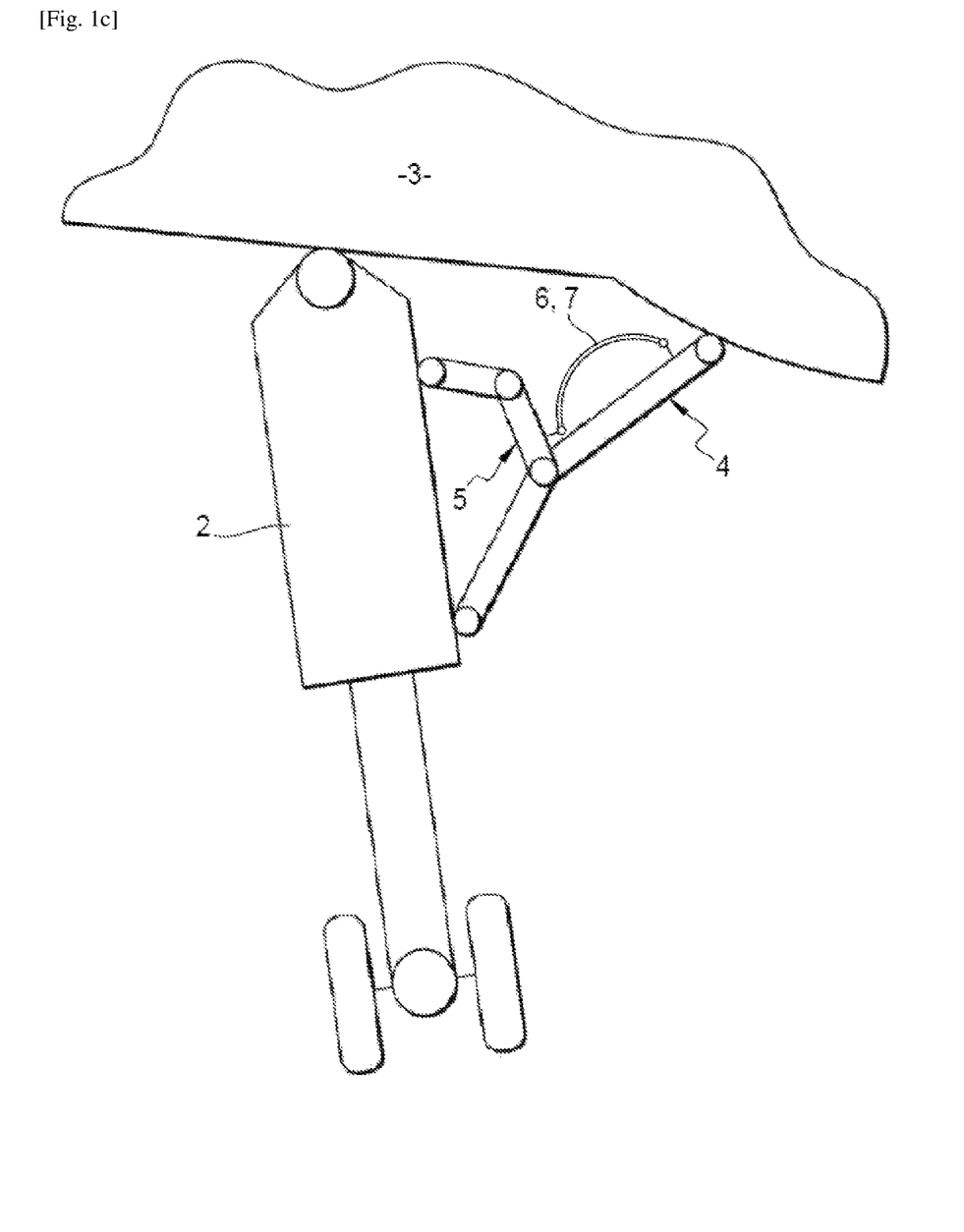
FIG. 1c is is a view analogous to FIG. 1a, showing the undercarriage in an intermediate position at the beginning of the raising stage.

For this purpose, the blade 7 is substantially straight when the links 5a and 5b are in the locked position (FIG. 1a), and it takes on an arcuate shape when the link 5b pivots about the axis X2 (FIGS. 1b and 1c).

The blade 7 thus forms a spring blade applying a force P on the link 5b for bringing the links 5a and 5b into the substantially aligned position.

With reference to FIGS. 1b and 1c, the drive actuator is designed to break the alignment of the links 5a and 5b by overcoming the force P exerted by the blade 7 opposing its own buckling. Raising the knee 5c brings the rods 4a and 4b out of alignment, thereby raising the knee 4c and thus causing the leg 2 to pivot towards its retracted position (FIGS. 1b and 1c).

Figure 2:
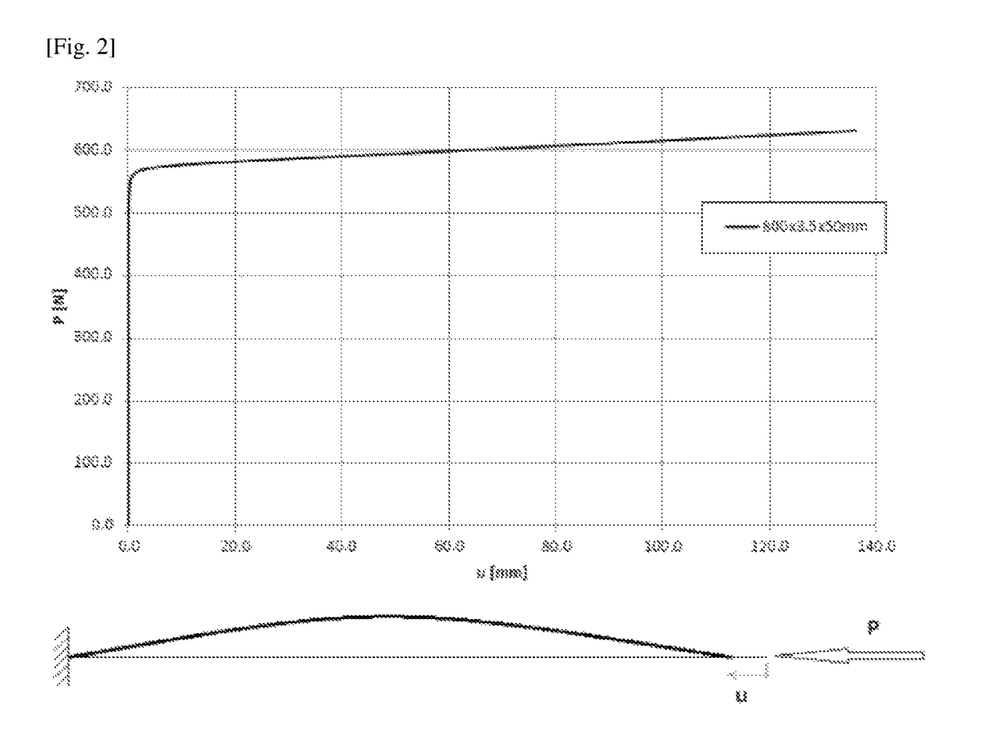
FIG. 2 is a graph plotting the compression force produced by the spring blade as a function of its movement.

As shown in FIG. 2, the force P delivered by the blade 7 after being deformed by a small amount U is sufficient to keep the links 5a and 5b in the locked position. Furthermore, the force P varies very little when the deformation U is increased, in particular in comparison with the linear behavior of coil springs. Thus, when the leg 2 goes from its deployed position to its retracted position, the force P produced by the blade 7 is limited, thereby limiting the forces that need to be overcome by the drive actuator in order to raise the undercarriage 1. Furthermore, the spring formed by the blade 7 is less expensive and somewhat lighter.

It should be observed that the blade 7 needs to be positioned on the breakable strut 4 in a manner that is different from the positioning of coil springs, since the blade 7 is arranged to operate exclusively in compression and not frequently in traction.

The main parameters needed for designing the blade 7 are:
- the force needed for holding the links 5a and 5b in their substantially aligned position;
- the mechanical characteristics of the material from which the blade 7 is made (conventional elastic limit Rp0.2, Young's modulus E, fatigue curve, . . . );
- the maximum deformation of the blade 7 during deployment and retraction of the leg 2, in particular for guaranteeing the mechanical strength of said blade 7; and
- the maximum buckling of the blade during deployment and retraction of the leg 2, in particular in order to limit the space occupied by the blade 7 throughout the retraction/extension movement of the leg 2.

Figure 5:
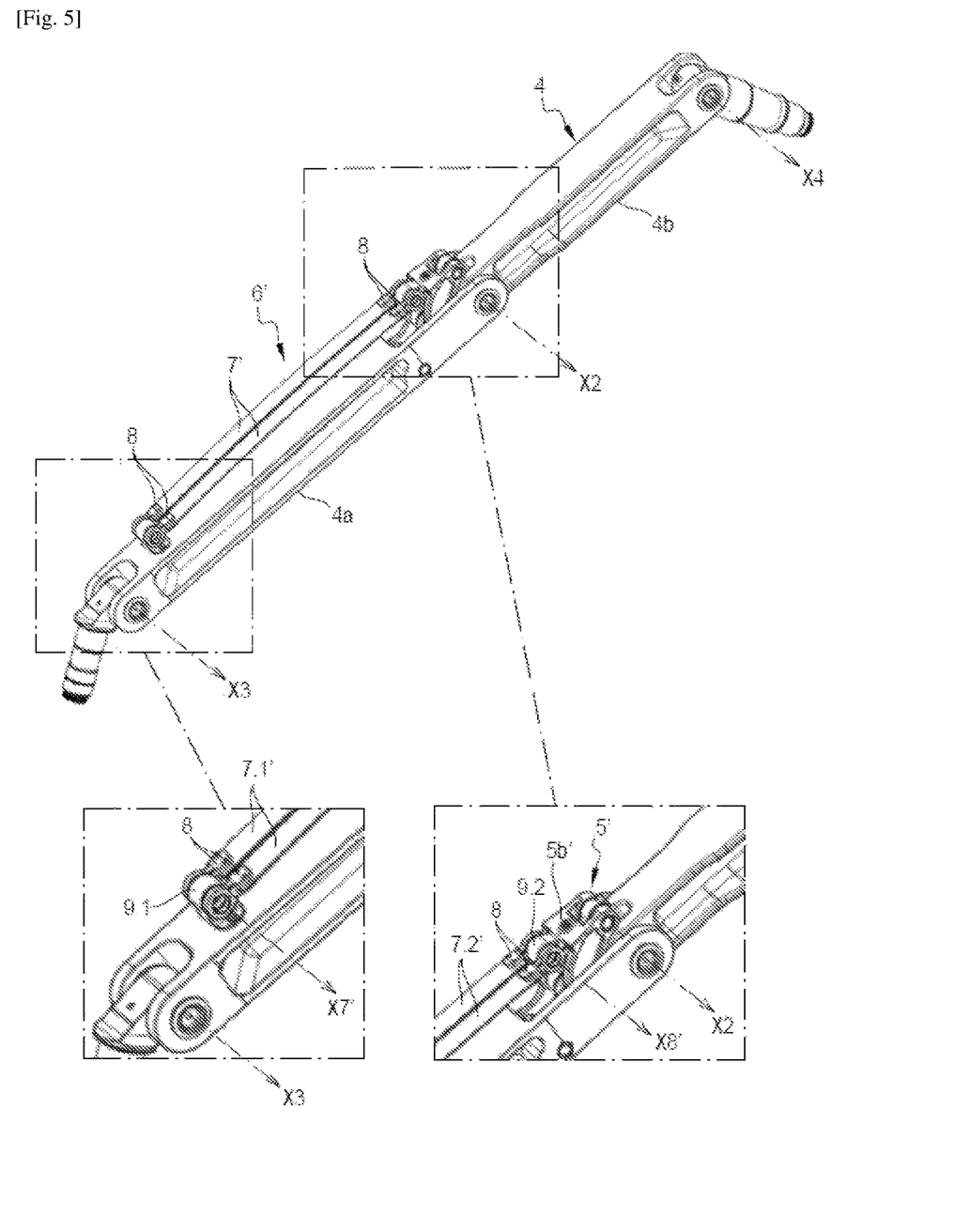
FIG. 5 is is a perspective view of a portion of an undercarriage in a fourth embodiment of the invention.
Figure 6:
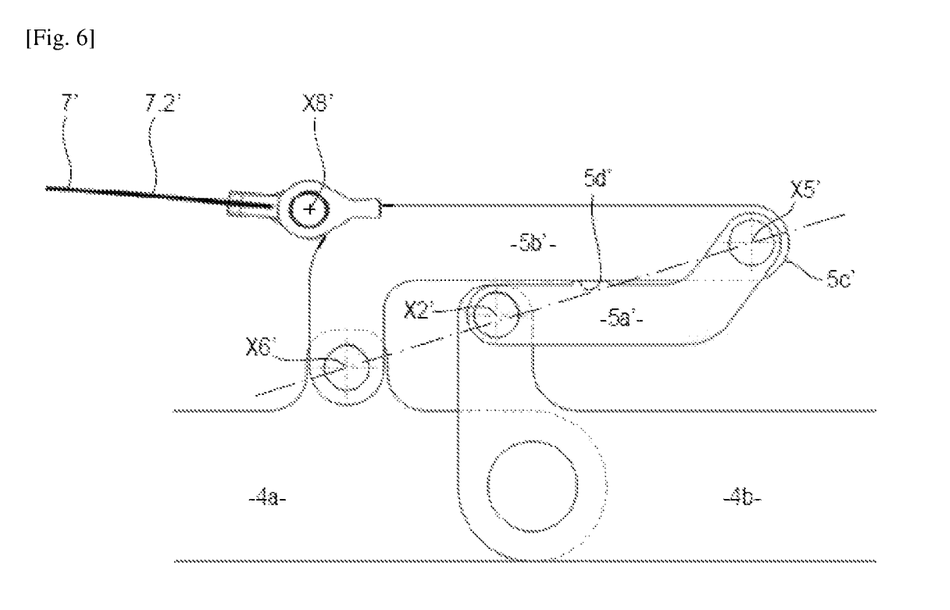
FIG. 6 is is a diagrammatic view of the locking member of the undercarriage shown in FIG. 5.

FIG. 5 shows another embodiment of the invention, in which the undercarriage 1 includes a stabilizer member that is said to be mounted "internally" in order to hold the first and 2nd rods 4a and 4b in the aligned position. The stabilizer member 5' comprises two links 5a' and 5b' that are hinged together about a hinge axis X5' at a knee 5c'. The link 5a' is hinged to the rod 4b about an axis X2', and the link 5b' is hinged to the rod 4a about a hinge axis X6'. The hinge axes X2', X5', and X6' of the links 5a' and 5b' are held in a substantially aligned position by a locking member 6' urging the links 5a' and 5b' towards the locked position as shown in FIG. 6 and as defined by an abutment 5d' between the links 5a' and 5b'.

When it is thus stabilized in a substantially aligned position, the breakable strut 4 opposes any pivoting of the leg 2 about its hinge axis X1. As is well known, the links 5a' and 5b' are designed in such a manner as to reach the locked position shown in FIG. 6 after the hinge axis X2' of the link 5a' has gone a little beyond the hinge axes X2', X5', and X6' being geometrically in alignment. In known manner, the hinges are arranged to avoid becoming statically indeterminate, e.g. by means of operating clearances or at least one ball joint.

With reference to FIG. 5, the locking member 6' includes a spring for holding the hinge axes X2', X5', and X6' of the links 5a' and 5b' elastically in the substantially aligned position. In this embodiment, the spring comprises two metal blades 7' of elongate shape that extend parallel to each other along the rod 4a. The blades 7' are identical and present thickness and width that are generally constant, with their width being taken as extending substantially parallel to the hinge axes X1-X4 and being greater than their thickness.

The blades 7' have first ends 7.1' pivotally connected to the rod 4a to pivot about a common pivot axis X7' situated in the proximity of the hinge axis X3 of the rod 4a, and second ends 7.2' pivotally connected to the link 5b' to pivot about a common pivot axis X8' in the proximity of the hinge axis X2 of the knee 4c. Thus, when the leg 2 is in its deployed position, the blades 7' are in a deformed state close to their rest state and the ends 7.1' are spaced apart from the ends 7.2' by a first distance; when the leg 2 is in its retracted position, the blades 7' have buckled and are in a deformed state with the ends 7.1' being spaced apart from the ends 7.2' by a second distance that is less than the first distance. It is the folding of the locking member 6' that causes the ends 7.1' and 7.2' to move towards each other and thus causes the blades 7' to buckle. The blade 7' are thus stressed elastically in compression, and they tend to return towards their rest state, with the ends 7.1' and 7.2' tending to move apart from each other back towards the first distance.

For this purpose, each of the first and second ends 7.1' and 7.2' of each of the blades 7' is riveted to a fitting 8 that is arranged to be pivotally connected to a tongue 9.1 fastened to the rod 4a or to a tongue 9.2 integral with the link 5a' in such a manner that the blades 7' are substantially straight when the links 5a' and 5b' are in the locked position (FIGS. 5 and 6), and can take up an arcuate shape when the link 5b' pivots about the axis X6'.

Each of the blades 7' thus forms a spring blade applying a force to the link 5b' for bringing the hinge axes X2', X5', and X6' into a substantially aligned position. The presence of two blades 7' serves in particular to provide redundancy in the event of one of the two blades 7' failing.

The drive actuator is designed to break the alignment of the hinge axes X2', X5', and X6' by overcoming the force exerted by the blades 7' opposing their own buckling. Raising the knee 5c' brings the rods 4a and 4b out of alignment, thereby raising the knee 4c and thus causing the leg 2 to pivot towards its retracted position.

The force delivered by the blades 7' after being deformed by a small amount is sufficient to keep the links 5a' and 5b' in the locked position. The force varies very little with increasing deformation. Thus, when the leg 2 goes from its deployed position to its retracted position, the force produced by the blades 7' is limited, thereby limiting the forces that needed to be overcome by the drive actuator in order to raise the undercarriage 1.

Naturally, the invention is not limited to the embodiment described, but covers any variant coming within the ambit of the invention as defined by the claims.

The number, the shapes and the dimensions of the blades 7, 7' need not be the same as shown in FIGS. 1a-1d, and 5.

Figure 3:
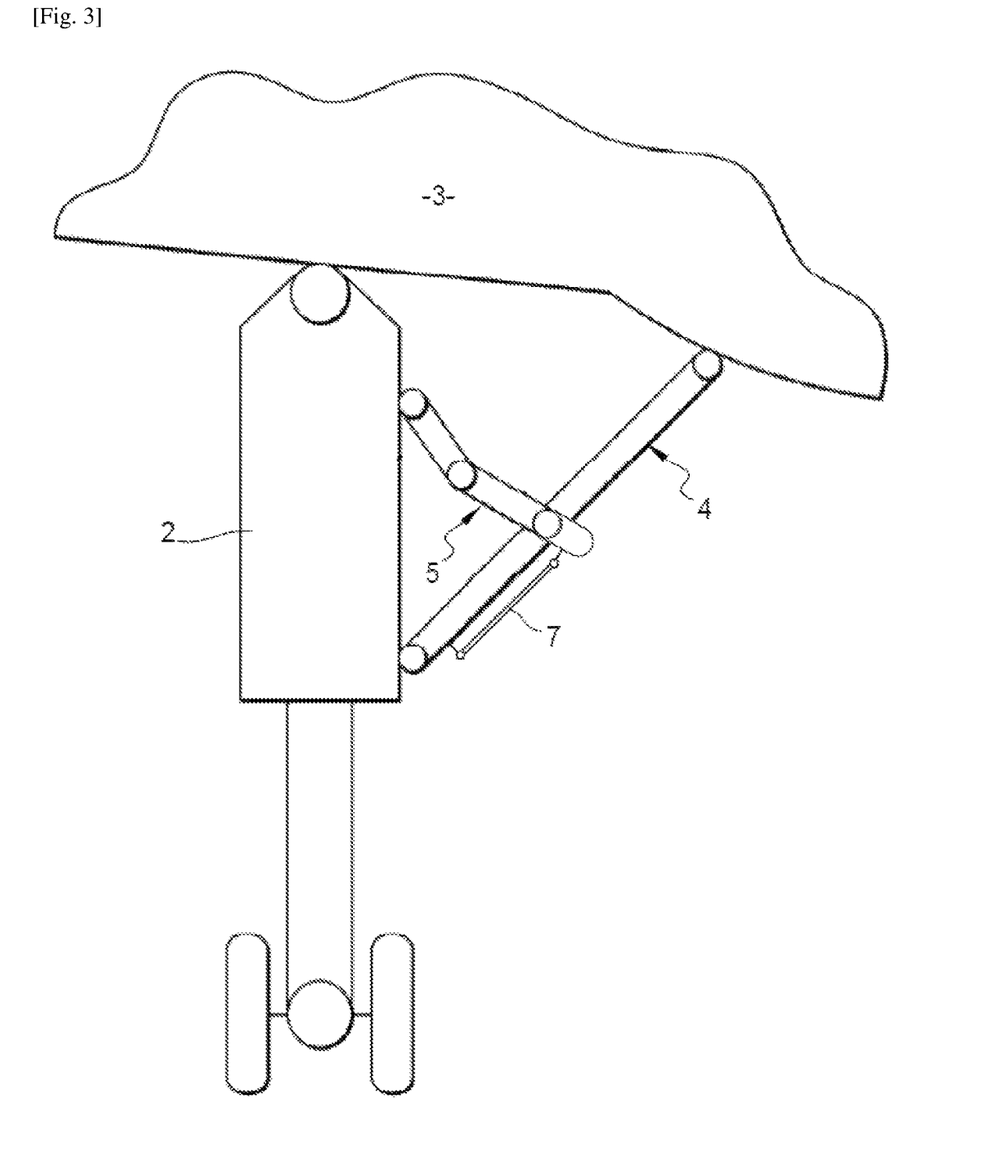
FIG. 3 is a view analogous to FIG. 1 showing an aircraft undercarriage in a second embodiment of the invention.

Although above, the blades 7, 7' extend along the rod 4a (so-called "internal" mounting), they could equally well extend along the rod 4b (so-called "external" mounting). The blades 7, 7' are then pivotally connected to the stabilizer member 5, 5' and to the rod 4b so as to be stressed in compression (FIG. 3).

Figure 4:
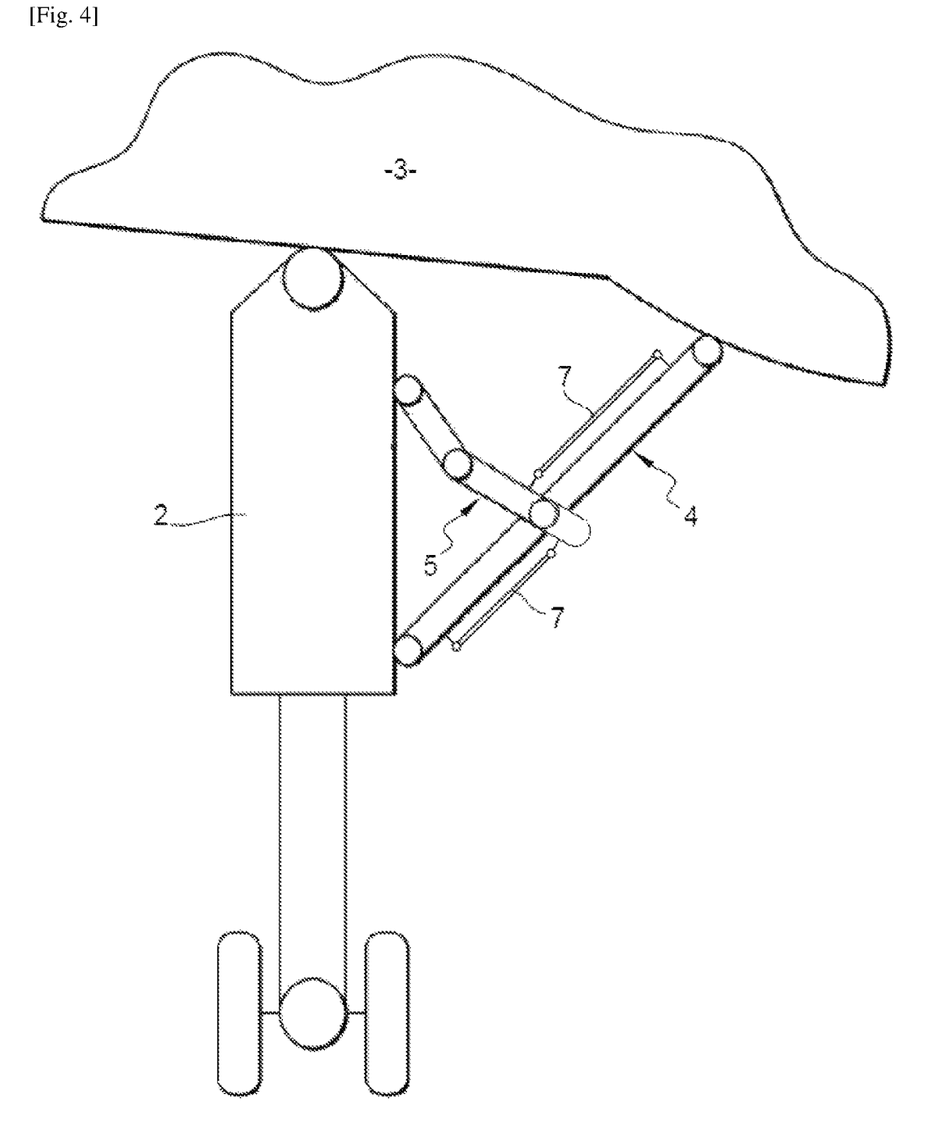
FIG. 4 is a view analogous to FIG. 1 showing an aircraft undercarriage in a third embodiment of the invention.

The leg 2 may equally well be stabilized by combining the action of one or more pivotally-mounted blades extending along the rod 4a with the action of one or more pivotally-mounted blades extending along the rod 4b (FIG. 4).

The blades 7, 7' may be made out of any suitable material (metal, composite, . . . ).

The blades 7, 7' may be pivotally connected to the rods 4a and 4b and on the stabilizer member 5, 5' by any appropriate means.

Although above the leg 2 is held in the deployed position by a single breakable strut 4, the invention also applies equally to undercarriages comprising a leg that is held in the deployed position by a plurality of breakable struts. At least one of the breakable struts would then be fitted with a stabilizer member including at least one spring blade.

The invention claimed is:

1. An aircraft undercarriage comprising:
   a leg arranged to be connected to an aircraft structure to be movable between a deployed position and a retracted position;
   at least one brace member for holding the leg in a deployed position and comprising a first rod hinged to the aircraft structure and a second rod hinged to the first rod and to the leg;
   a stabilizer member for holding the first rod and the second rod in an aligned position and comprising a first link and a second link that are hinged to each other, with at least one of the first link and the second link being hinged to the at least one brace member; and
   at least one spring for elastically urging the hinges of the first link and the second link into an aligned position;
   wherein the at least one spring is a spring blade arranged to be subjected elastically to an axial compression force when the hinges of the first link and the second link leave the aligned position, the spring blade having a first end pivotally connected to the first rod or to the second rod about a first pivot axis which is fixed with respect to the first end, and a second end pivotally connected to the stabilizer member about a second pivot axis which is fixed with respect to the second end.

2. The aircraft undercarriage according to claim 1, wherein the spring blade is pivotally connected about the first pivot axis to the first rod and about the second pivot axis to the stabilizer member.

3. The aircraft undercarriage according to claim 1, wherein the spring blade is pivotally connected about the first pivot axis to the second rod and about the second pivot axis to the stabilizer member.

4. The aircraft undercarriage according to claim 1, wherein the spring blade is a metal plate of substantially constant thickness.

5. The aircraft undercarriage according to claim 1, wherein the spring blade comprises two spring blades in order to provide redundancy in the event of one of the two spring blades fails.

6. The aircraft undercarriage according to claim 5, wherein the two spring blades are substantially identical and are pivotally connected to the first rod and to the stabilizer member.

7. The aircraft undercarriage according to claim 5, wherein the two spring blades are substantially identical and are pivotally connected to the second rod and to the stabilizer member.

8. The aircraft undercarriage according to claim 5, wherein one of the two spring blades is pivotally connected to the first rod and to the stabilizer member, and the other of the two spring blades is pivotally connected to the second rod and to the stabilizer member.

9. The aircraft undercarriage according to claim 1, wherein the first link is hinged to the leg and the second link is hinged to the at least one brace member.

10. The aircraft undercarriage according to claim 1, wherein the first link is hinged to the second rod and the second link is hinged to the first rod.

11. The aircraft including at least one aircraft undercarriage according to claim 1.

* * * * *